United States Patent [19]
Russell et al.

[11] 3,805,398
[45] Apr. 23, 1974

[54] REMOTE ANGLE MEASUREMENT

[76] Inventors: Michael King Russell, 3 Culross Close; Anthony William Russell, 265 Old Bath Rd., both of Cheltenham, England

[22] Filed: Oct. 26, 1972

[21] Appl. No.: 301,044

[30] Foreign Application Priority Data
Nov. 5, 1971 Great Britain .................. 51625/70

[52] U.S. Cl. ...................... 33/312, 33/300, 33/313, 33/366
[51] Int. Cl. .......................... G01c 9/04, G01c 9/14
[58] Field of Search .............. 33/312, 313, 300–304, 33/354, 355, 361, 362, 363, 366, 317, 328, 300, 364

[56] References Cited
UNITED STATES PATENTS

| | | | |
|---|---|---|---|
| 2,356,999 | 12/1944 | Boucher | 33/312 |
| 3,596,365 | 8/1971 | Verhagen | 33/366 |
| 2,939,221 | 6/1960 | Pickett | 33/300 |
| 2,841,880 | 7/1958 | Golemon | 33/300 |
| 2,992,492 | 7/1961 | Roussin | 33/312 |
| 2,057,787 | 10/1936 | Monroe | 33/313 X |
| 3,587,175 | 6/1971 | Armistead | 33/312 |
| 2,219,512 | 10/1940 | Cooper et al. | 33/313 X |
| 3,374,549 | 3/1968 | Hanson | 33/364 |

*Primary Examiner*—John W. Huckert
*Assistant Examiner*—Milton S. Gerstein
*Attorney, Agent, or Firm*—George L. Church; Donald R. Johnson; John E. Holder

[57] ABSTRACT

The orientation or roll angle of a body, particularly a drilling tool in a borehole, is measured by sensing the position of a mass free-rolling in a circular path. The mass rolling to reach the lowermost point in its path takes a position with respect to body-fixed axes indicative of the roll angle and independent of the inclination of the body.

The sensor is preferably a transducer having fixed elements such as coils disposed for field measurement in two principal axes and a field-modifying member, such as a magnet, free-rolling under gravity in a circular track in a plane parallel to that of the axes.

The free-rolling member may be a gyratory roller carrying a rod magnet and the fixed elements may be the coils of a fluxgate arrangement sensitive to the position of the magnet.

In its application to the drilling of deep boreholes with a steered mud-motor drilling tool, the arrangement provides for continuous indication at the surface of the roll angle when attached to the drill in predetermined angular relation.

14 Claims, 7 Drawing Figures

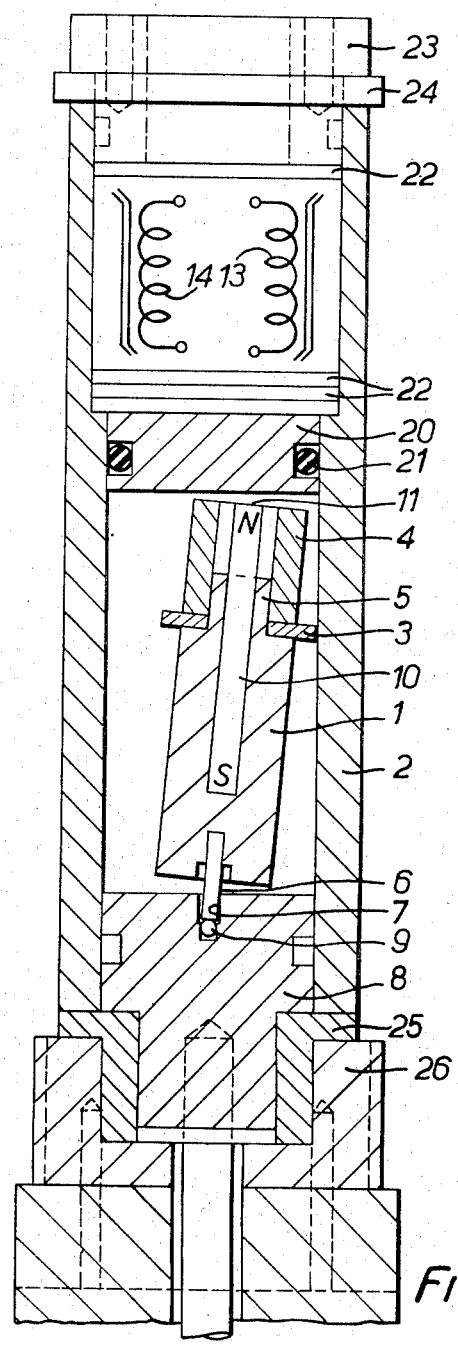
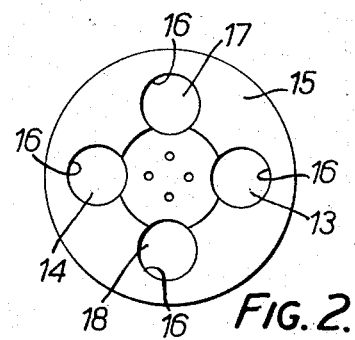
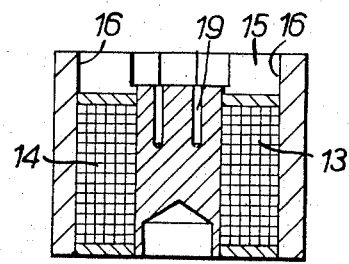
FIG.1.
FIG.2.
FIG.3.

REMOTE ANGLE MEASUREMENT

FIELD OF THE INVENTION

This invention relates to methods of and means for measuring angles for remote indication, and particularly for measuring the orientation of a body irrespective of the inclination of the body. The invention is particularly but not solely applicable to the measurement of the orientation or roll angle of the head of a drilling tool in a borehole.

STATEMENT OF INVENTION

According to the invention, orientation of a body about a particular axis of the body is measured by sensing the position, with respect to two perpendicular body-fixed planes intersecting in the orientation axis, of a mass free-rolling in a plane at right angles to the orientation axis and in a circular path centered on the orientation axis. The mass rolling to reach its lowermost point takes a position with respect to the body-fixed planes indicative of the orientation of the body planes with respect to the vertical plane containing the orientation axis and independent of the inclination of that axis.

The sensor therefor preferably comprises a transducer having fixed elements disposed for field measurement in two principal axes and a field modifying member free-rolling under gravity in a circular track in a plane parallel to that of said axes. The fixed elements may be sensing coils cooperating with a bar magnet constituting the field modifying member and axially disposed in a gyrating roller.

The invention is of particular advantage in application to the drilling of deep boreholes with a drilling tool driven by a mud motor which can be steered, to follow a desired path, provided that the existing path of the borehole is known and the orientation or roll angle of the head of the drilling tool can be ascertained. The invention provides a method of and means for ascertaining the roll angle in such drilling, the sensor being adapted to be attached to the head of the drilling tool, to give continuous indications at the surface during drilling.

BRIEF DESCRIPTION OF DRAWINGS

FIG. 1 is a sectional view of a sensor unit comprising an electromagnetic transducer with sensing coils shown diagrammatically, FIG. 2 is an end view of the sensing coils in a mounting block which fits into the sensor unit of FIG. 1, FIG. 3 is a sectional side view of the sensing coils and mounting block of FIG. 2.

DESCRIPTION OF THE PREFERRED EMBODIMENT

Figure 4:
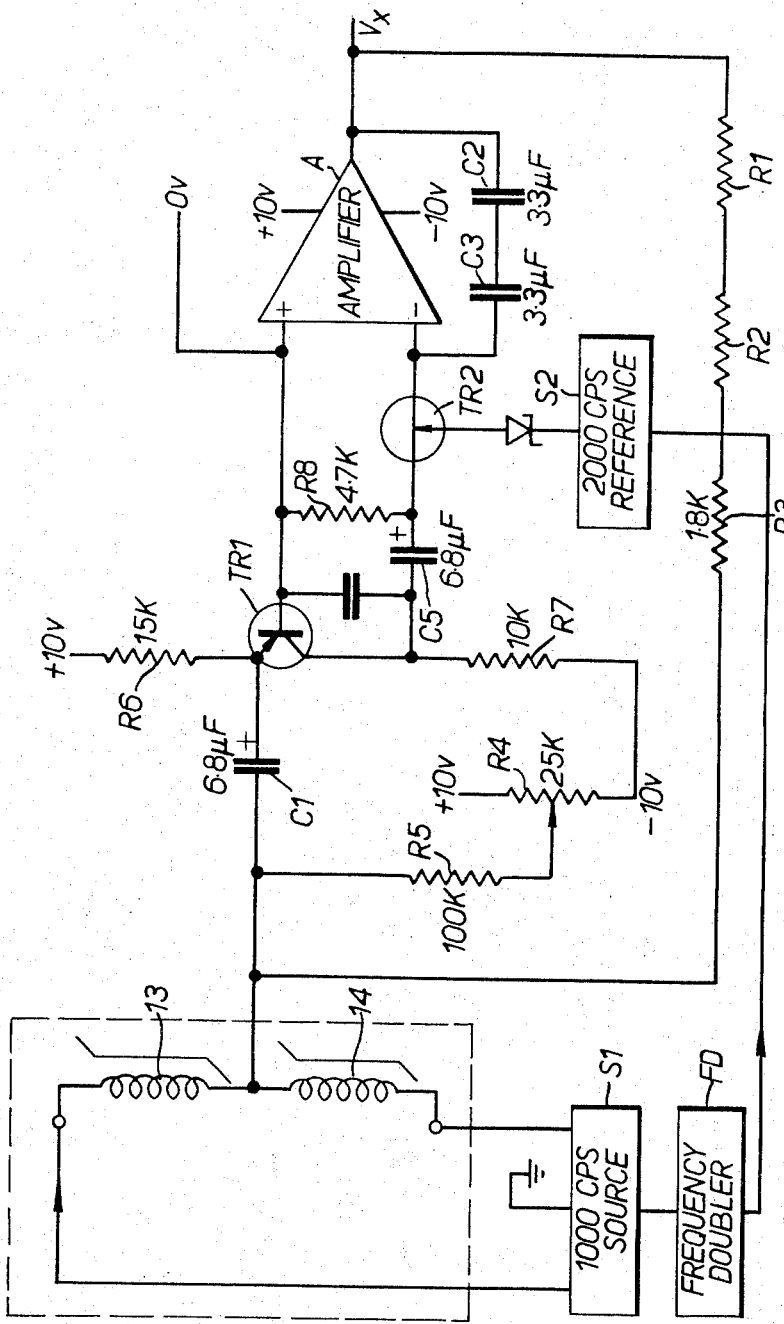
FIG. 4 is a circuit diagram of an electronic arrangement for deriving measurements from the sensor unit.

In the embodiment shown in FIGS. 1 to 4, an electromagnetic transducer is arranged for the measurement of the orientation or roll angle of the head of a drilling tool in a borehole when the transducer is mated to the tool head in a determined angular relation. The transducer in a housing forming a sensor unit comprises a mass free-rolling in a circular path in a plane of orientation measurement transverse to the longitudinal axis of the housing.

As shown in FIG. 1, the rolling member is a cylindrical body 1 of brass or other non-magnetic material within a tubular housing or body 2 and carrying a coaxial annular disc 3 rolling on the inner face of the housing 2, the disc being secured by a sleeve 4 on a disc-locating stud 5 at one end of the body 1. At the other and lower end of the body 1 is an axially projecting pin 6 loose in a bore 7 in a base plug 8 of the housing and seated on a bearing ball 9 at the bottom of the bore 7. Hence the body 1 has a foot-step bearing providing for gyratory rolling motion within the housing 2. For damping the movement of the rolling member, the housing 2 is part-filled with a viscous silicone oil or other viscous damping fluid.

A rod magnet 10 is secured in an axial bore in the body 1 to present a pole face 11 at the upper end region of the sleeve 4, and the magnetic field from this pole face 11 affects the flux in a group of four sensing coils, of which two are diagrammatically shown and designated 13, 14, located in an upper end region of the housing 2. The coils are of solenoid type with saturable magnetic cores as used in other flux gates and lie axially of the housing and equally spaced circumferentially of the housing, that is, in two planes at right angles.

Thus the rolling member includes a bar or rod magnet and the position of one of the poles of the magnet is detectable by magnetically sensitive sensors. The two planes containing opposite pairs of sensing coils define body-fixed or housing fixed axes and the orientation of the transducer unit with respect to these two fixed axes can be determined by using the coils in the manner of a fluxgate as hereinafter described.

The structure for the coils 13, 14 is shown in one form in FIGS. 2 and 3. A cylindrical moulding 15 of a plastics material such as nylon is formed with four axially directed bores 16 in which the two coils 13, 14 and the two further coils 17, 18 are located. An axial socket or other connector with contacts 19 is provided for the making of external connections. The coil structure is inserted in the end of the housing 2 (FIG. 1) over a sealing plug 20 having a sealing ring 21. Packing discs 22 are provided as necessary and an upper cap 23 is fitted to the housing 2 over a plastics spacing ring 24. The housing 2 has a base bush 25 and a bottom cap 26 for mounting in a predetermined angular relation to the head of a drilling tool.

The sensor unit comprising the transducer in the housing 2 is associated with two similar electronic circuits each as shown in FIG. 4 and constituting flux-gate amplifiers, generally as known in the art.

Referring to FIG. 4, a pair of transducer coils 13, 14 is connected as a half-bridge across a balanced A.C. source S1, conveniently of 1,000 c.p.s. Imbalance of flux in the coils sets up a second harmonic voltage, at the junction of the coils, which is applied through a capacitor C1 to an amplifying transistor TR1, and in the output circuit of that transistor is gated by a synchronous switch, comprising a field-effect transistor TR2, for phase-sensitive demodulation. Transistor TR2 is turned successively on and off under control of a double frequency (2,000 c.p.s.) reference S2 fed through a frequency doubler FD from the source S1. The demodulation product is applied to a high-gain amplifier A with AC feedback through capacitors C2, C3 and a DC feedback path including resistors R1, R2 and R3 to the input of the circuit, that is, the junction of the coils 13 and 14. Thereby the output voltage Vx causes a proportional current to flow through the feedback resistors and the current gives rise to a field in the coils which restores the flux balance. Hence Vx is a measure of the relative displacement $x$ of the rolling magnet with respect to the coils 13 and 14. The displacement $y$ is similarly measured in the duplicate circuit which is connected to the second pair of coils 17, 18.

Small initial errors in balance are eliminated by a potential divider R4 from which an adjustable DC voltage is applied to the junction of the coils 13, 14 through a high-value resistor R5. Coupling and decoupling resistors R6, R7, R8 and capacitors C4 and C5 are included in the amplifier comprising the transistor TR1.

The output voltages Vx and Vy of the two amplifiers represent the X and Y components of the vector at the roll angle $\phi$ and hence the roll angle $\phi$ is readily deduced.

Although in the embodiment described, electromagnetic sensors and particularly fluxgates are employed, it will be appreciated that other sensors deriving the ordinates representing the position of the rolling body can be used to determine the roll angle.

Figure 5:
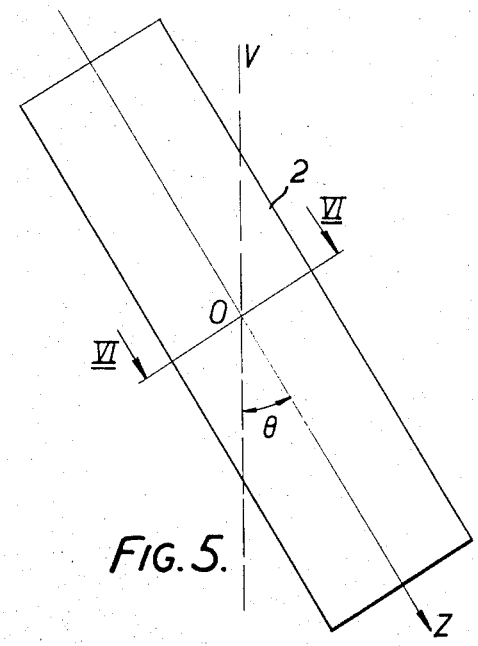
FIGS. 5, 6 and 7 are diagrams illustrative of the underlying method of measurement.
Figure 6:
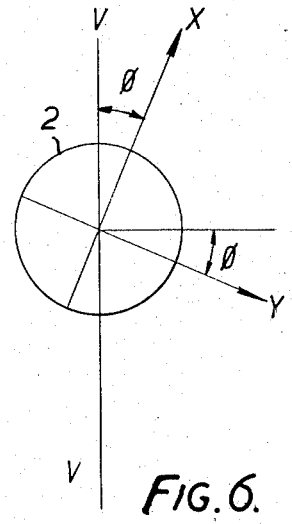
Figure 7:
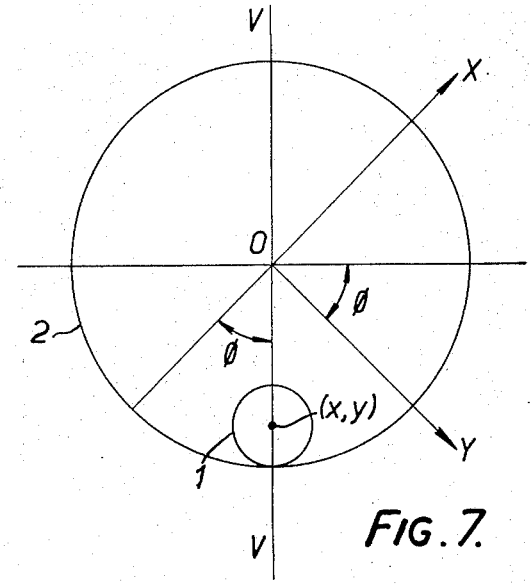

The principles underlying the invention, irrespective of the sensing means adopted, will now be described with reference to FIGS. 5, 6 and 7. In FIG. 5, the transducer body 2 having an axis OZ is shown inclined at angle to the vertical OV. FIG. 6 is a view of the body 2 on the section line VI — VI of FIG. 5, showing the roll angle $\phi$ of the fixed body axes OX, OY from the vertical plane VV. FIG. 7 shows the rolling member 1 at position $x$, $y$ in relation to the fixed body axes OX and OY.

The roll angle $\phi$ of the transducer, which is the angle between a given diameter of the cross-section through the transducer body 2 and the vertical plane containing the transducer body axis, can be obtained from the transducer outputs which are independent of the inclination $\phi$ of the transducer body axis. The transducer functions essentially by allowing a rolling member 1 to roll to a lowside position in the transducer body where its position is detected with respect to two fixed body sensor axes OX and OY lying in a cross-section of the transducer body 2 and the rolling member 1. If the sensors along OX and OY yield output voltages $V_x$ and $Y_y$ respectively, where $V_x$ is proportional to $x$ and $V_y$ is proportional to $y$, then the roll angle $\phi$ can be obtained through $\sin \phi / \cos \phi = y/-x = V_y/-Vx$.

Hence, from this relationship, the roll angle $\phi$ of a body-fixed axis OZ can be obtained irrespective of the inclination of that axis, by sensing the position $x$, $y$ of the mass, free-rolling in a right circular path about the axis, with respect to two transverse body-fixed axes OX and OY. For indicating the roll angle of a drilling tool in a borehole, the axes OX, OY and OZ are aligned with the axes of the drilling tool.

We claim:

1. Means for measuring the orientation of a housing about a particular axis of the housing wherein the particular axis has a predetermined relationship with respect to the housing; comprising a mass free-moving with respect to the housing; means defining limits of movement of said mass when measurements of orientation are being made such that any point on the mass moves in a plane at right angles to the particular axis and in a fixed radius circular path centered on the particualr axis; and means for sensing the position of the mass with respect to two housing-fixed planes intersecting in the particular axis.

2. Means according to claim 1, wherein the sensing means comprises a transducer having housing-fixed field measuring sensors disposed for field measurements and the free-moving mass is a field-modifying member moving under gravity in the circular path, and wherein fields measured by said sensors are proportional to the distances of the free-moving mass from the two housing-fixed planes.

3. Means according to claim 2, wherein the housing-fixed field measuring sensors are sensing coils and the free-moving mass includes a bar magnet constituting the field modifying member.

4. Means according to claim 3, wherein the sensing coils are arranged and connected as fluxgates.

5. Means according to claim 1 wherein the housing is adapted to be attached to a borehole drilling tool in predetermined angular relation thereto for remote indication of the roll angle of the drilling tool.

6. Means according to claim 1 wherein the free-moving mass is an elongated member mounted for rolling motion against an interior cylindrical wall surface in the housing.

7. Means according to claim 6 including a magnet forming a part of the elongated member to present a pole face at the free end of the member, and wherein said sensing means includes a plurality of fixed coils in circular array beyond the pole face.

8. Method of measuring the roll orientation of a housing about a particular axis of the housing wherein the particular axis has a predetermined relationship with respect to the housing, comprising the steps of; free moving a mass within a housing; limiting the movement of such mass when measurements of roll orientation are being made such that any point on the mass moves in a plane at right angles to the particular axis and in a fixed radius circular path centered on the particular axis; and sensing the position of the mass with respect to two housing-fixed planes intersecting in the particular axis.

9. Method of measuring the orientation or roll angle $\phi$ of a housing about a particular axis OZ thereof irrespective of the inclination of that aixs, comprising the steps of sensing the position free-moving in a right circular path about the particular axis with respect to two transverse housing-fixed axes OX, OY, and deriving the roll angle $\phi$ from the relationship $\sin \phi / \cos \phi = y/-x$.

10. Method according to claim 9 applied to indicate the roll angle of a drilling tool in a borehole, wherein the axes OX, OY and OZ are aligned with axes of the drilling tool.

11. An apparatus for measuring the roll angle of a drilling member about a particular roll axis of the drilling member, comprising: a housing having an inner cylindrical wall portion; a mass mounted for movement against said wall portion within said housing whereby during roll angle measurements said mass moves only in a fixed radius ciruclar path against said wall portion in a plane perpendicular to said roll axis, and transducer means having sensing elements arranged in fixed planes with respect to said particular roll axis, said sensing elements being arranged with respect to said mass for measuring the magnitude of a parameter of the mass, which parameter has a relation to the position of the mass with respect to said fixed planes.

12. The apparatus of claim 11 wherein said sensing elements are field measuring sensors and said mass includes a field modifying member.

13. The apparatus of claim 12 wherein said sensing elements lie in two housing-fixed planes which intersect in the particular roll axis.

14. An apparatus for measuring the roll angle of a housing about a particular roll axis of the housing, comprising: a mass movable under the action of gravity within said housing; means bounding the movement of said mass to a right circular path of fixed radius around said roll axis and centered thereon; and transducer means having sensing elements mounted in fixed relation to the housing and distributed around said roll axis, said transducer means arranged to produce outputs dependent upon the displacement of the mass from said roll axis in two housing-fixed axes at right angles to each other and to said roll axis, independently of the pitch of the housing in the vertical plane of said roll axis.

* * * * *